(12) United States Patent
Lee

(10) Patent No.: US 7,447,407 B2
(45) Date of Patent: Nov. 4, 2008

(54) LUMINOUS ORNAMENTS ASSEMBLIES

(76) Inventor: Jean-Hway Lee, P.O. Box No. 6-57, Junghe, Taipei 235 (TW)

(*) Notice: Subject to any disclaimer, the term of this patent is extended or adjusted under 35 U.S.C. 154(b) by 247 days.

(21) Appl. No.: 11/068,814

(22) Filed: Mar. 2, 2005

(65) Prior Publication Data

US 2006/0198587 A1    Sep. 7, 2006

(51) Int. Cl.
*G02B 6/04*    (2006.01)

(52) U.S. Cl. .................... 385/115; 385/121; 385/901

(58) Field of Classification Search ......... 385/115–121, 385/901; 40/427–445, 452–547; 362/551–582
See application file for complete search history.

(56) References Cited

U.S. PATENT DOCUMENTS 5,818,998 A * 10/1998 Harris et al. ................. 385/100
6,370,305 B2 * 4/2002 Lochkovic et al. .......... 385/114

* cited by examiner

*Primary Examiner*—Phan Palmer

(57) ABSTRACT

The present invention is related to assemblies of luminous ornaments having optical fiber cables arranged in parallel, each formed by luminous optical fibers sheathed with a transparent tube, with interlaced connection elements formed therebetween, thereby forming a luminous net when being expanded.

10 Claims, 6 Drawing Sheets

LUMINOUS ORNAMENTS ASSEMBLIES

BACKGROUND OF THE INVENTION (a) Field of the Invention

The present invention relates to assemblies of luminous ornaments and more particularly for making up optical fiber cables by luminous optical fibers sheathed with a transparent tube and for arranging optical fiber cables in parallel, with interlaced connection elements formed therebetween, thereby forming a luminous net when being expanded.

(b) Description of the Prior Art

Referring to Patent No. 86101437, a conventional luminous ornaments assembly is using one optical fiber cable, formed by luminous optical fibers sheathed with a transparent tube and each optical fiber having cuts round the perimeter surface for emitting light, to demonstrate only a liner luminous ornament effect, which is a major drawback for not being able to develop extensive and versatile applications.

SUMMARY OF THE INVENTION

In view of the aforesaid drawback of the prior invention, it is an objective of the present invention to use more than one optical fiber cable and arrange thereof in parallel, with interlaced connection elements formed therebetween, to form a luminous net when being expanded.

It is another objective of the present invention to insert a linear stiffener along the axis of the cable to enable the form of the net being fixed or the luminous ornament being shaped in a wavy or standing form.

To enable a further understanding of the said objectives and the technological methods of the invention herein, the brief description of the drawings below is followed by the detailed description of the preferred embodiments.

BRIEF DESCRIPTION OF THE DRAWING

FIG. 1A shows a partial enlarged view of interlaced arranged cuts round the perimeter surface of each optical fiber of the present invention.

DETAILED DESCRIPTION OF THE PREFERRED EMBODIMENTS

The present invention relates to luminous ornaments assemblies and more particularly for arranging optical fiber cables in parallel, each formed by luminous optical fibers sheathed with a transparent tube, with connection elements formed therebetween in an interlaced arrangement, thereby forming a luminous net when expanding.

Figure 1:
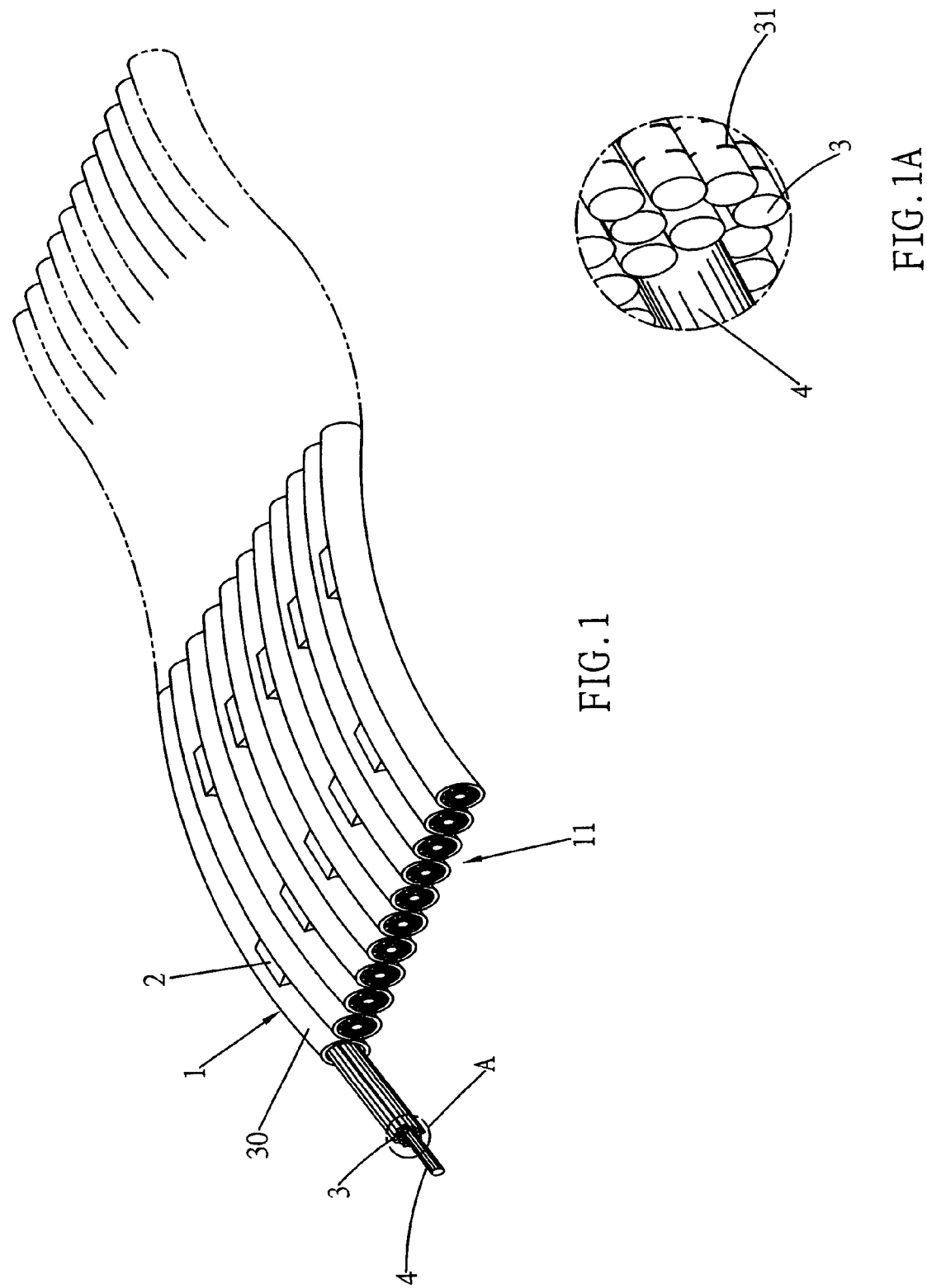
FIG. 1 shows a perspective view of the present invention.
Figure 2:
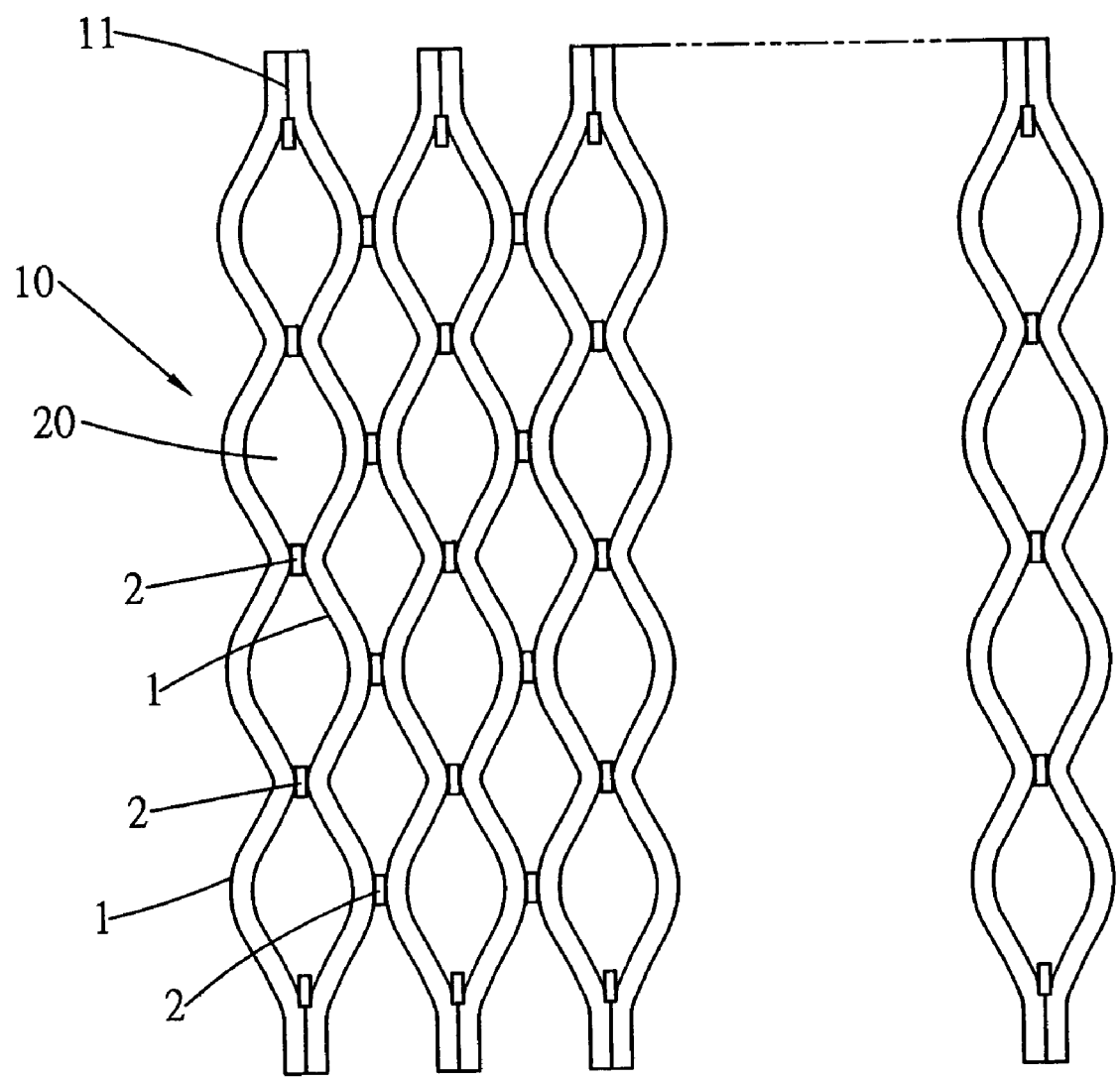
FIG. 2 shows a perspective view of the present invention being expanded to form a net.

Referring to FIGS. 1, 1A, and 2. The present invention relates to luminous ornaments assemblies including optical fibers 3 bound together and inserted into a transparent tube 30 to form an optical fiber cable 1. Having optical fiber cables 1 in parallel arrangement 11 and with connection elements 2 formed therebetween in an interlaced form for connecting cables 1, meshes 20 of a net 10 thereby formed when being expanded. With light introduced from an end of each optical fiber cable 1 to lighten thereof and with a light dimming effect on each optical fiber 3 along radial direction, the luminous ornament net 10 thereby formed.

Referring to FIG. 1. Along the axis of each optical fiber 3, a linear stiffener 4, which is flexible enough that a bend can be made easily by bare hands, formed therein to enable meshes 20 of a luminous net 10 being fixed when being expanded. The linear stiffener 4 can be exempted when requiring a soft character for covering the luminous net 10 on a curved surface.

With interlaced arranged cuts 31 round the perimeter surface of each optical fiber 3 to enable light emitting thereof and with light losing about 200~300 db/M along radial direction of each optical fiber 3, a luminous net 10 thereby formed. Additionally, with introduction of light of various wave lengths, optical fiber cables 1 thereby generating colorful light effect.

Figure 3:
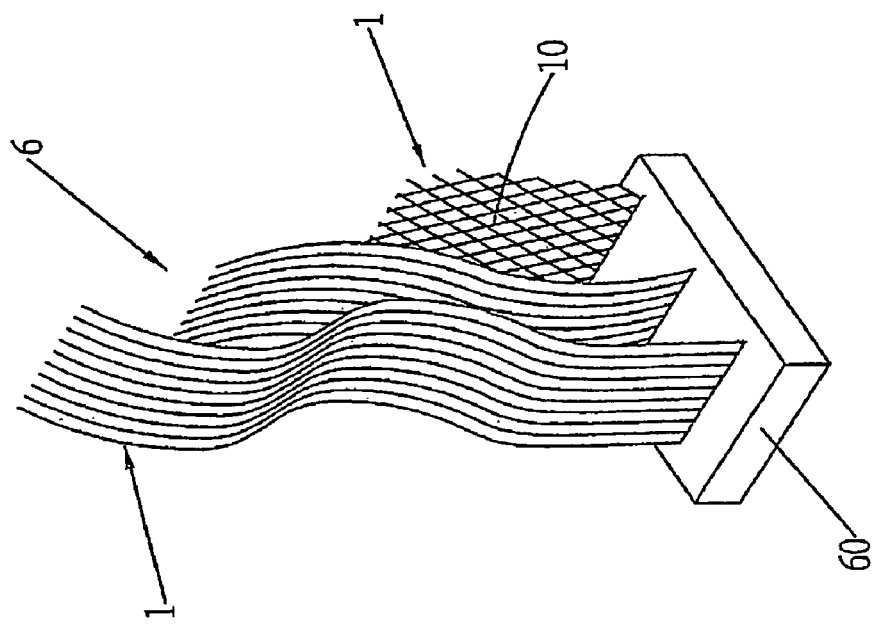
FIG. 3 shows a perspective view of the present invention being formed in a lantern form.

Referring to FIG. 3. By circling the luminous net 10 and with connection elements 2 connecting end sides 12 thereof, a luminous lantern 5 thereby formed.

Figure 4:
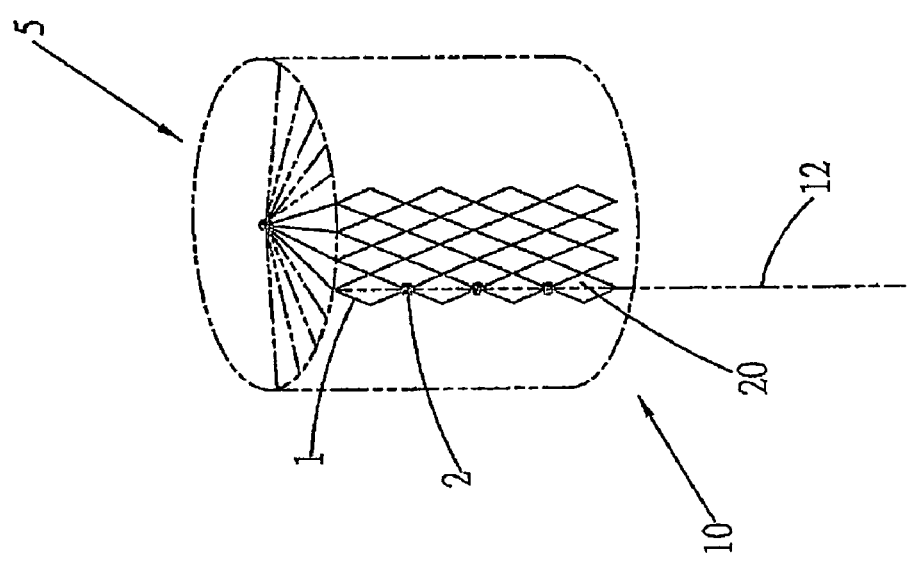
FIG. 4 shows a perspective view of the present invention being formed in various standing forms.

Referring to FIG. 4. With the stiffener 4 inside and also with light supplying through a base 60 to the luminous net 10, the present invention can be standing art lights 6 in forms of a net or a wavy surface or any form created by the user.

Figure 5:
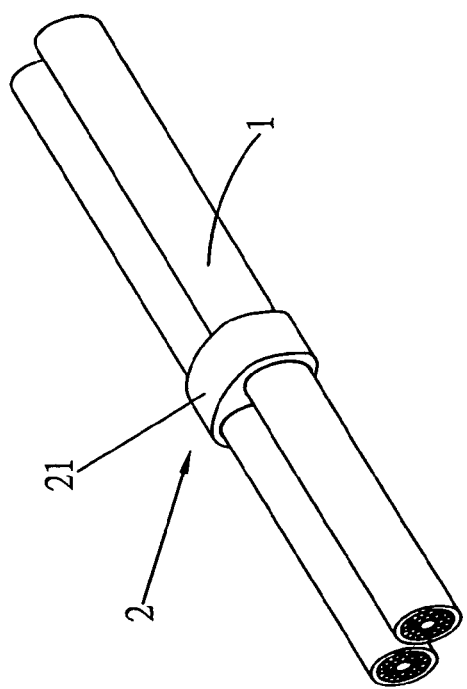
FIG. 5 shows a perspective view of using a buckle as the connection element in of the present invention.

Referring to FIG. 5. The connection element 2 can be a plastic or metal buckle 21 of "C" shape, with the opening of "C" locking adjacent optical fiber cables 1.

Figure 6:
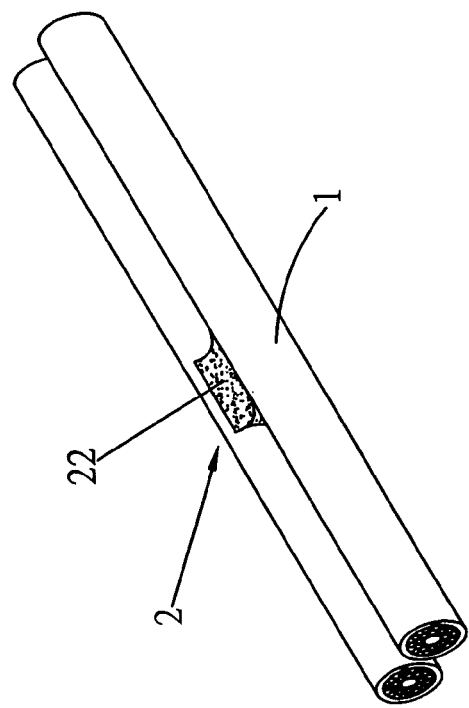
FIG. 6 shows a perspective view of using adhesive as the connection element of the present invention.

Referring to FIG. 6. The connection element 2 can be bound together by using adhesive 22 to connect adjacent optical fiber cables 1.

Figure 7:
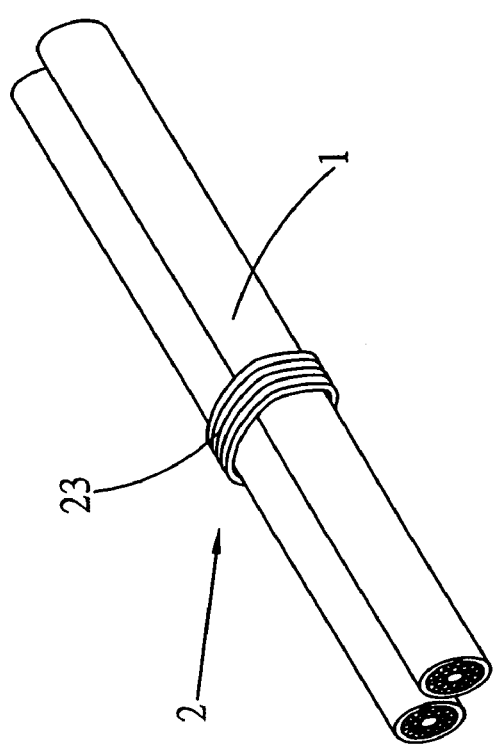
FIG. 7 shows a perspective view of using a wire as the connection element of the present invention.

Referring to FIG. 7. The connection element 2 can be bound together by using a wire 23 to connect adjacent optical fiber cables 1.

Figure 8:
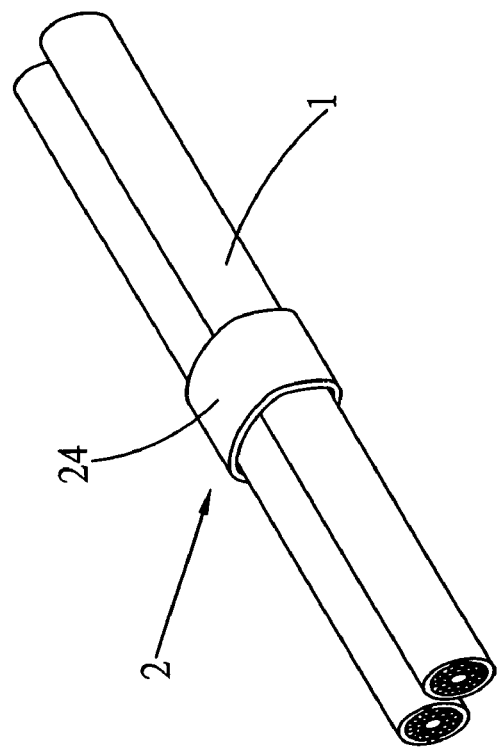
FIG. 8 shows a perspective view of using a tape as the connection element of the present invention.

Referring to FIG. 8. The connection element 2 can be bound together by using a tape 24 to connect adjacent optical fiber cables 1.

Figure 9:
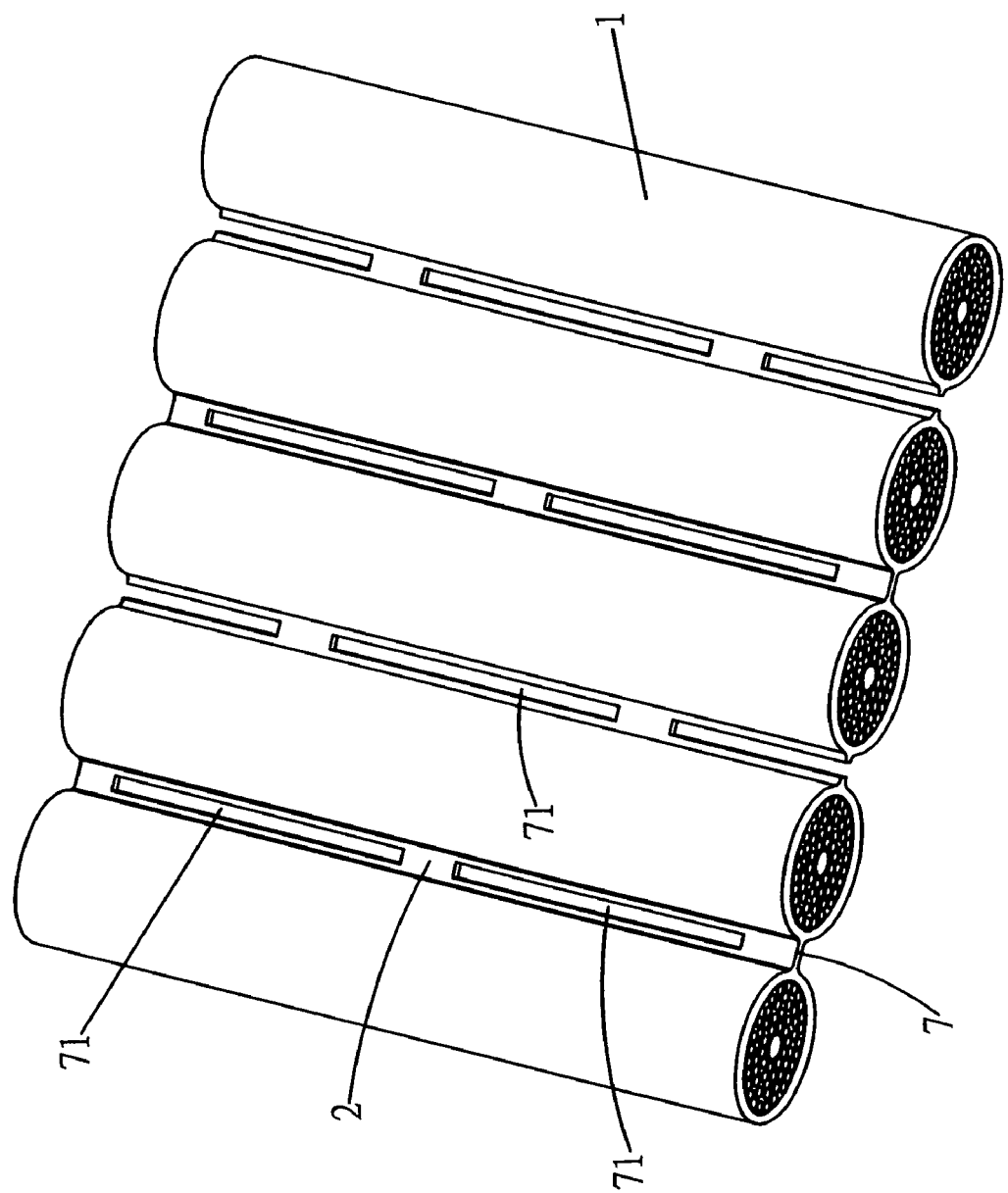
FIG. 9 shows a perspective view of another example for the formation of the connection element of the present invention.

Referring to FIG. 9. Other than those externally formed connection elements 2 as recited above, connection elements 2 may also be formed along with optical fiber cables 1 production when having connection strips 7 formed between optical fiber cables 1, wherein each connection strips 7 having openings 71 and connection elements 2 in a form that connection elements 2 being interlaced arranged among adjacent connection strips 7, thereby a luminous net 10 can also be formed, as in FIG. 2.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A luminous ornament assemblies comprising optical fiber cables in parallel, each formed by at least a luminous optical fiber sheathed with a transparent tube, wherein a linear stiffener along the axis formed and interlaced connection elements formed therebetween, thereby enabling a luminous net, when being expanded, formed when having a light source supplied from an end of each optical fiber cable.

2. The luminous ornament assemblies as recited in claim 1, wherein a linear stiffener being exempted when requiring a soft character for the optical fiber cable.

3. The luminous ornament assemblies as recited in claim 1, wherein interlaced cuts for emitting light formed round the perimeter surface of each optical fiber.

4. The luminous ornament assemblies as recited in claim 1, wherein the connection element being a "C" shaped plastic or metal buckle.

5. The luminous ornament assemblies as recited in claim 1, wherein the connection element being bound together by using adhesive.

6. The luminous ornament assemblies as recited in claim 1, wherein the connection element being bound together by using a wire.

7. The luminous ornament assemblies as recited in claim 1, wherein the connection element being bound together by using a tape.

8. A luminous ornament assemblies comprising optical fiber cables in parallel and having connection strips formed therebetween, wherein each connection strips having openings and connection elements in a form that connection elements being interlaced arranged among adjacent connection strips.

9. The luminous ornament assemblies as recited in claim 8, wherein at least a stiffener formed inside each optical fiber cable.

10. The luminous ornament assemblies as recited in claim 8, wherein interlaced cuts for emitting light formed round the perimeter surface of each optical fiber.

* * * * *